UNITED STATES PATENT OFFICE.

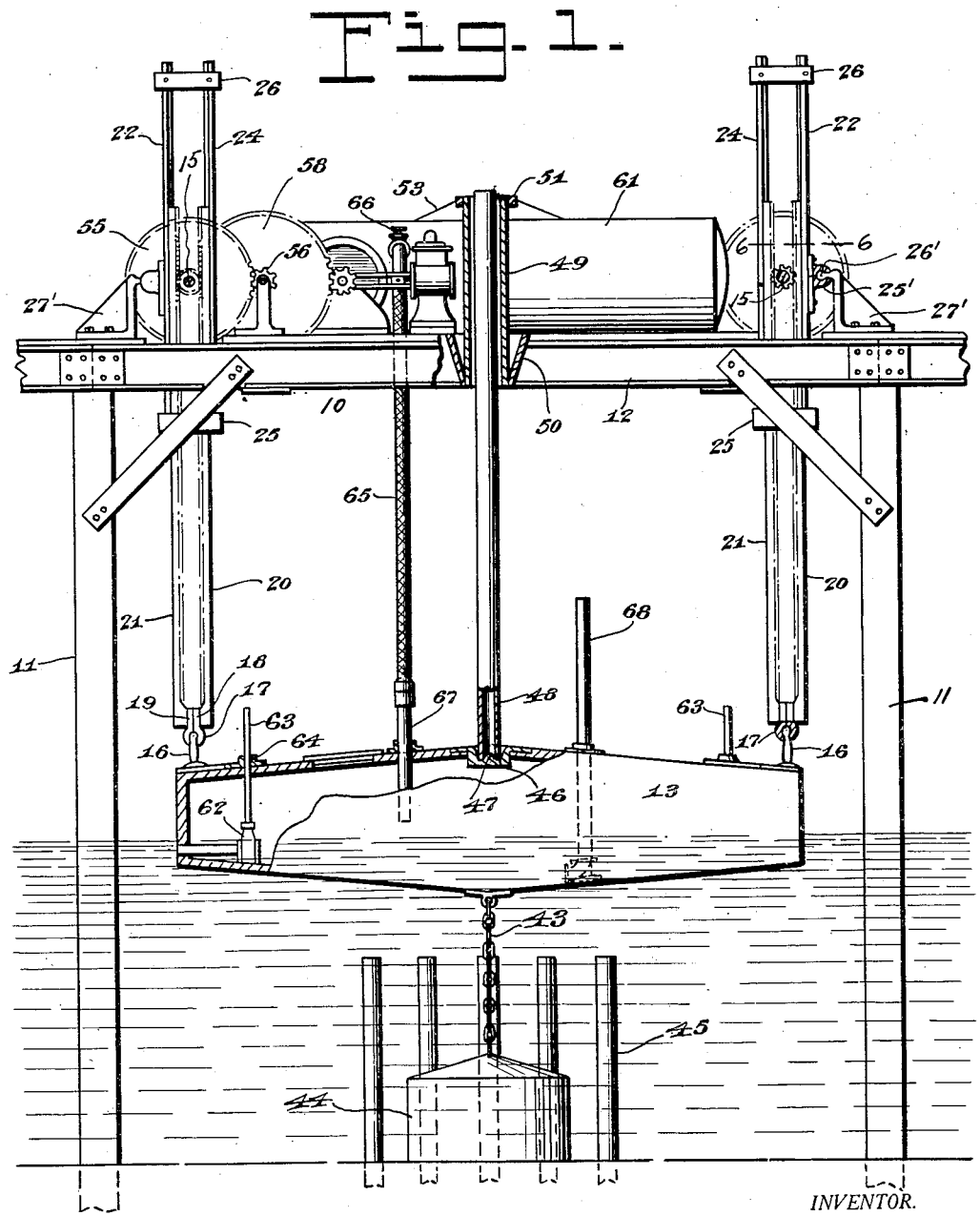

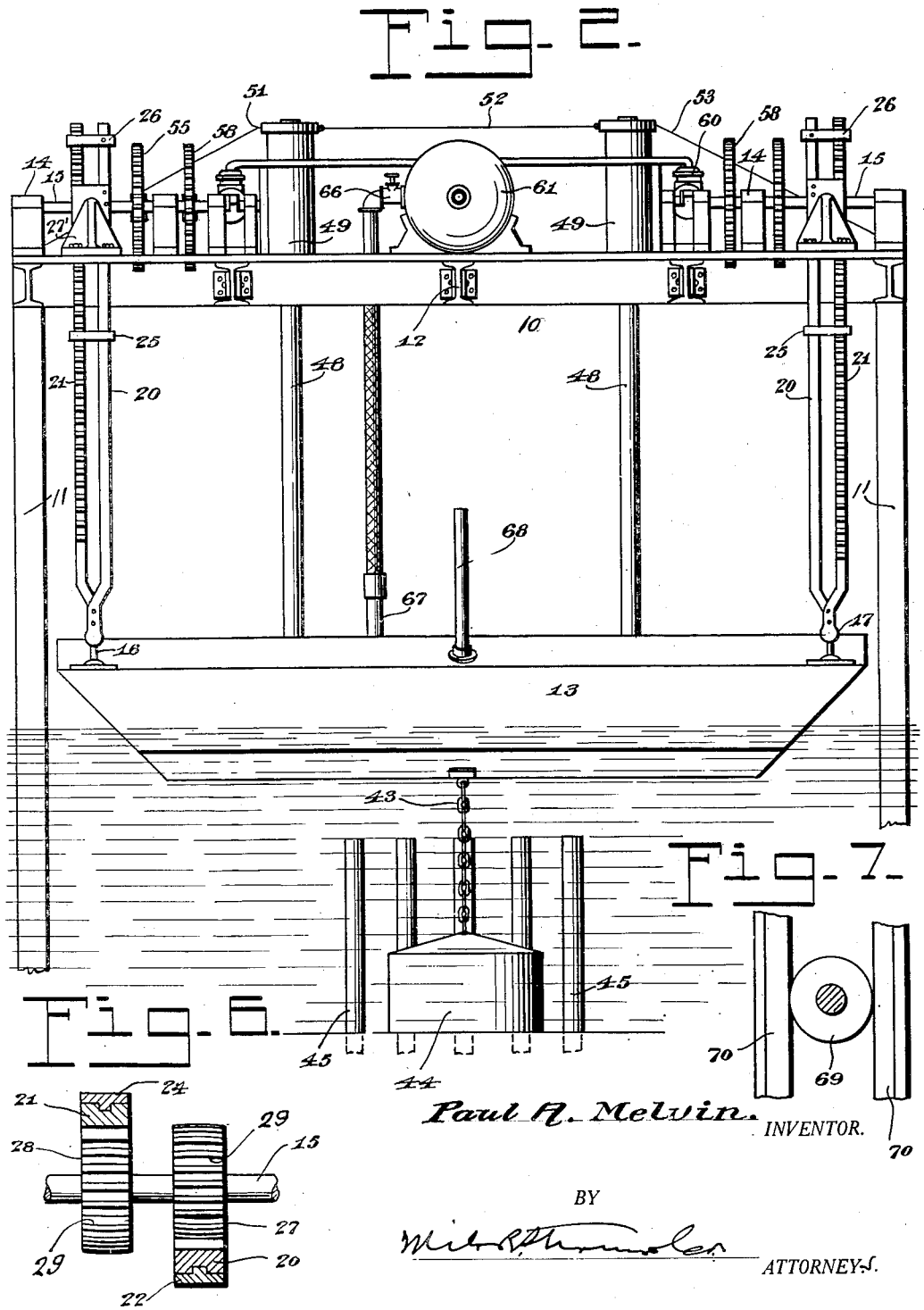

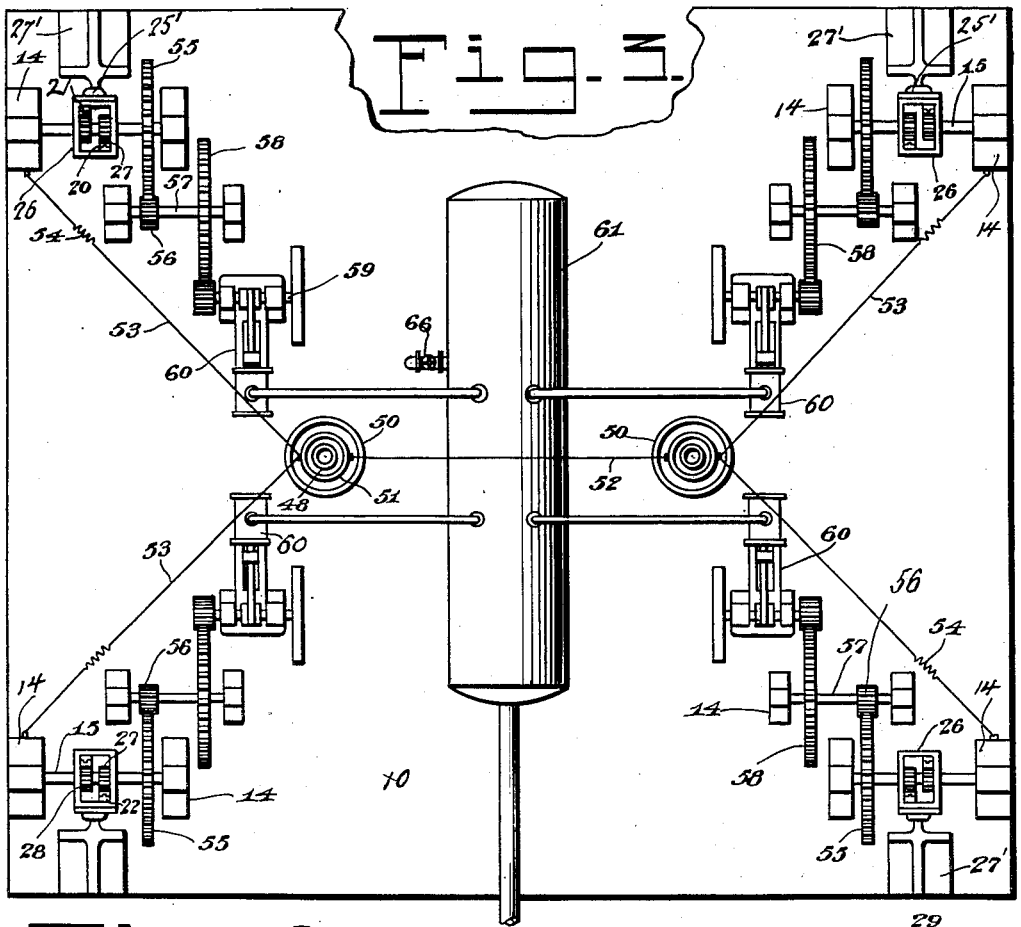
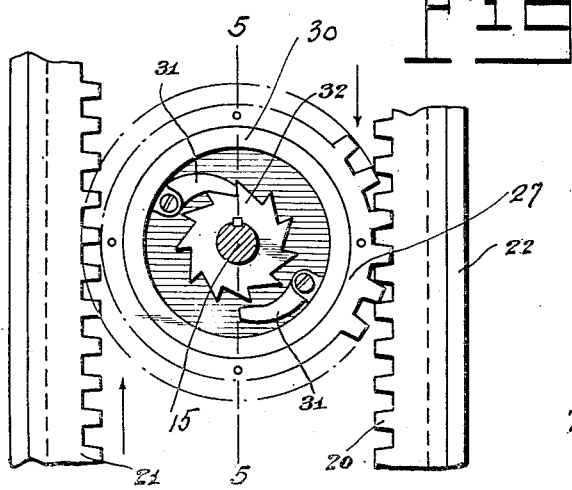
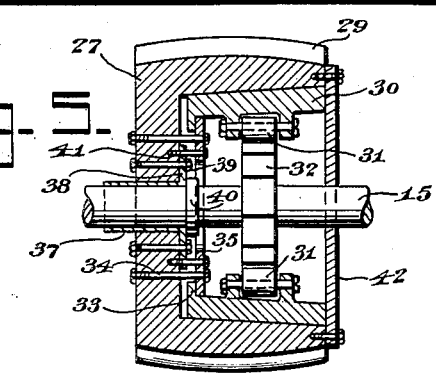

PAUL A. MELVIN, OF CHICAGO, ILLINOIS.

WATER MOTOR.

1,403,702.  Specification of Letters Patent.  Patented Jan. 17, 1922.

Application filed June 2, 1920. Serial No. 386,137.

*To all whom it may concern:*

Be it known that I, PAUL A. MELVIN, a citizen of the United States, residing at Chicago, in the county of Cook and State of Illinois, have invented new and useful Improvements in Water Motors, of which the following is a specification.

This invention relates to improvements in water motors of that type consisting of an energy receiving member which responds to wave and tide movements, and the object of the invention is to provide a construction in which a buoyant energy receiving member is used to compress air, said member being supported for movement in a plurality of directions.

A still further object of the invention is to provide means for resiliently holding the buoyant member in a position to be actuated by the waves and tide.

Another object of the invention is to provide means actuated by the buoyant member for compressing air, regardless of the angle at which the buoyant member is moved.

A still further object of the invention is to provide a buoyant member of such configuration that the same is susceptible to the slightest movement of the body of water in which the same is positioned.

Another object of the invention is to provide means operable during excessive movement of the buoyant member, for filling the same with water and sinking it to prevent injury to the motion transmitting mechanism.

The invention also has for its object to provide the buoyant member with a pendent weight operable in a manner to insure the descent of said member against the resistance of the motion transmitting and receiving elements, the operation of which is dependent on the movements of said member.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is an end elevation, parts being shown in section, and others removed to more clearly illustrate the arrangement of the motion transmitting elements;

Fig. 2 is a front elevation;

Fig. 3 is a top plan view;

Fig. 4 is an elevation of a ratchet device;

Fig. 5 is a sectional view of said device on the line 5—5 of Fig. 4, and

Fig. 6 is a horizontal section on the lines 6—6 of Fig. 1, and Fig. 7 is a detail of a modification.

In the drawings, 10 designates a framework which consists of vertically disposed beams or piles 11 and longitudinally disposed beams 12 supported thereby. This framework supports a plurality of bearings 14, each of which supports a shaft 15. The energy receiving member which is acted upon by the waves and tide, consists of the substantially rectangular float 13, which is of greater dimension at its center than at its ends. The male member 16 of a universal coupling is supported at each corner of said rectangular member, the member 16 being received by the female member 17 which consists of the plates 18 and 19 clamped between the rack bars 20 and 21. There are four pairs of such rack bars, said bars being positioned to move vertically with the movement of the floating member, and being guided in their vertical movement by beams 22 and 24, a strap 25 embracing said beams adjacent to their lower ends and a strap 26 embracing said beams adjacent their upper ends. Each one of the beams 22 carries the female member 25' of a universal joint, this female member receiving the male member 26' which is secured or formed integral with brackets 27', secured to the longitudinal beams 12.

It will be noted by this construction that the vertical guides for the rack bars are supported for a swinging movement in any direction. This construction is carried out at all four corners of the floating member 13, the member thus being supported to move in any direction with respect to the frame 10. Two pinions 27 and 28 are mounted upon each shaft 15, said pinions being provided with curved teeth 29, the pinions meshing with the respective pairs of racks 20, and 21 positioned in staggered relation. The curvature of the pinion teeth permits the racks to swing in any direction with respect to the shaft without getting out of mesh. Each of the pinions is provided with a pawland-ratchet structure which will allow the shaft to be rotated in one direction and prevent rotation when the floating member 13 is assuming its normal position. The pawl-and-ratchet driving connection referred to comprises the following parts:

Each pinion 27 and 28 has a tapered side recess in which seats a conical clutch member 30 which is hollow and carries in its interior pivoted pawls 31 engaging a ratchet wheel 32 on the shaft 15, said ratchet wheel being made fast to the shaft. It will therefore be evident that when the pinion is being operated by its rack, the motion of said pinion is transmitted to the shaft 15 through the pawls and the ratchet wheel, it being understood that the pinion is loose on said shaft. This driving connection of course is produced only when the clutch member 30 is locked to the pinion 27, a yielding connection being provided which operates to release the parts when excessive strains are placed thereon, thereby preventing damage to the gearing. The yielding connection between the pinion 27 and the clutch member or carrier 30 for the pawls 31 comprises the following parts:

The inner end of the member 30 is spaced from the opposite wall of the recess in the pinion 27, so that it may be advanced when wear occurs, and said inner end of the member 30 has an internal annular flange or rim 33. Behind the flange 33 seats and is held by bolts 34 a ring 35, said bolts passing through the ring and through the pinion 27. The hub of the pinion 27 seats on a sleeve 37 having an annular flange 38 at its inner end which is bolted to the opposite wall of the pinion as shown at 39, and also abuts against a collar 40 on the shaft 15. The ring 35 carries pins 41 seating in apertures in the flange 38 and the body of the pinion. The sleeve 37 is loose on the shaft 15.

The clutch member 30 is drawn in by the bolts 34 to frictionally engage the pinion 27. In case of excessive strain, the clutched parts can slip, thus saving the gear teeth from damage. If the ring 35 tends to turn and shear off the bolts 34, the pins 41 will act as a stop, they being heavy and riveted to the ring.

The outer end of the recess in the pinion 27 in which the clutch member 30 seats, is closed by a cover plate 42 to prevent leakage of oil from the parts in said recess.

From the bottom of the float 13 is suspended, by means of a chain 43, a heavy weight 44 which rests on the bed of the stream or other body of water when the float is in its lowermost position. Around the weight 44 is built an enclosure consisting of piles 45, upon which the float rests when it is allowed to submerge in a manner and for a purpose to be presently described. The height of the piles 45 is such that the racks 20 and 21 do not get out of mesh with the pinions 27 and 28 when the float sinks and comes to rest on top of the piles.

The rise of the tide, and the action of the waves will impart movement to the floating member 13, the movement thus imparted to said member, whether the same be imparted at the corners or at the center, causing a vertical movement of the racks which will in turn rotate the shafts 15. It will be noted that these racks through the universal joints and the peculiar relation of the pinions 27 and 28 with the racks 21, will be permitted to assume any position with respect to the supporting structure 10, regardless of said position, and rotating the shafts 15 as the floating member is moved. It will be noted by this construction that any movement imparted to any portion of the floating member will cause a rotation of the shafts 15, the float being free to swing in any direction, and move vertically with respect to the support 10 regardless of the angle at which the float is disposed. When the tide goes down the weight 44 renders positive the descent of the float 13 against the combined resistance of the motion transmitting means and the mechanism driven thereby.

The floating member is provided at its center and adjacent each end, with a socket 46 in which is positioned a nipple or projection 47 which forms the male member of a universal joint, said nipple extending within the open end of a tube 48. These tubes extend and are slidable within sleeves 49, each of said sleeves being supported within a conical cup 50, supported by the longitudinal beams 12 of the structure 10. A collar 51 is secured to each of the sleeves at the upper terminals, the collars of the sleeves being connected by the guy rope or shroud 52. A plurality of shrouds 53 are connected to the side of the collar remote from the shroud 52. These shrouds 53 are connected to the bearings 14, the ropes which constitute the shrouds 53 being connected by the springs 54. The normal tendency of these resilient shrouds is to maintain the sleeves 49 in a vertical position, as said sleeves are permitted an oscillatory movement due to the oscillation of the floating member 13 by the waves.

A gear 55 is arranged upon each of the shafts 15, said gear meshing with a pinion 56 mounted on a counter shaft 57, a gear 58 mounted on said counter shaft imparting rotating to the shaft 59 of an air pump 60. This air compressing pump may be multicylindered or of any suitable construction, and it is connected to discharge into a reservoir 61, suitable check valves being disposed in said connection for preventing the return of the air.

It will be noted by this construction that a device of this character may be placed upon a body of water and that the movement of the tide and waves will actuate the floating member 13 to rotate the shafts 15 regardless of the direction in which the floating member is moved, any movement of the floating member that is caused by the tide and waves, and regardless of the point where the pressure is applied to the floating member being transmitted to the shafts 15, the rotation of said shafts actuating the air pumps to compress air in the reservoir 61. It will thus be noted that the movements of the floating member are not confined to any movement of the body of water, a "short" choppy sea being as effective in operating the pumping mechanism as a long steady swell, the floating member being by reason of its tapering end portions more susceptible to the action of the water than were such members of the same diameter throughout.

The floating member 13 is as before stated, a hollow rectangular body, a valve 62 being arranged in said floating member adjacent each of its corners, said valve being operable by a stem 63 which is guided in its vertical movement by bearings 64. During a storm, or in an unusually rough sea, the end portions of the floating member have a tendency to pound against the supporting structure and damage the pumping machinery, and to prevent this, the valve stems 63 project from the top of the floating member to contact with the structure 10, thus opening the valves 62 and admitting water to the float. Thus before the floating member can have damaged the pumping structure, the valves in the same will have been opened and water admitted to the floating member. As soon as the member has become filled with water, the same will be of sufficient weight to sink without damaging the pumping machinery.

In order to restore the float 13 to buoyant condition after it has been submerged or sunk as hereinbefore described, a connection between its interior and the compressed air reservoir 61 is provided. This connection is a flexible hose 65 having a valved connection 66 with the reservoir 61 and coupled to a pipe 67 entering the float 13. A discharge pipe 68 leads from the float 13 vertically and has its inlet end located close to the bottom of the float, on the inside thereof. Thus when the float 13 has been filled with water and submerged, if it is desired to restore the buoyancy of the float, the valve 62 is closed and compressed air is admitted to the interior of the float from the reservoir 61 to blow out the water through the pipe 68, said pipe rising to such a height that its upper or discharge end is above the water level when the float is submerged.

The many advantages in a construction of this character will be clearly apparent, as it will be noted that the entire structure is such as may be easily and economically manufactured and that the various parts may be readily assembled. Instead of a toothed gearing, a friction gearing as shown in Fig. 7 may be provided. In this view 69 denotes a friction wheel between slidable members 70, which are substituted for the rack bars 20 and 21.

What is claimed is:

1. A water motor comprising a buoyant energy-receiving member, a mechanism actuated by said member, and means actuated by excessive movements of said member to cause the same to be disconnected from the mechanism.

2. A water motor comprising a hollow and buoyant energy-receiving member, a mechanism actuated by said member, and means actuated by the excessive movement of said member for filling the same with water to submerge.

3. A water motor comprising a buoyant energy-receiving member, a mechanism actuated by the movement of said member, a plurality of concaved members, vertically disposed standards having their lower terminals seated in said concaved members, sleeves slidably receiving said vertically disposed members adjacent their upper terminals, concaved seats for the lower terminals of said sleeves, and a resilient connection between said sleeves and the stationary supporting member.

4. A water motor comprising a buoyant energy-receiving member, racks pivotally connected to said member, pivoted guides for said racks, a shaft, gears arranged on said shaft, said racks being arranged to rotate said gears to drive said shaft, said guides consisting of vertically disposed members, and spaced frames supported by said members and arranged to embrace said racks to direct the same in their upward movement.

5. A water motor comprising a hollow and buoyant energy-receiving member, a valved water inlet for said member to admit water thereinto for submerging the same, and means actuated by excessive movement of said member for opening the water admission valve.

6. A water motor comprising a hollow and buoyant energy-receiving member, a valved water inlet for said member to admit water thereinto for submerging the same, means actuated by excessive movement of said member for opening the water admission valve, a water outlet from the member, and means for admitting compressed air into the member to force the water therefrom through the outlet.

7. A water motor comprising a hollow and buoyant energy-receiving member, a valved water inlet for said member to admit water thereinto for submerging the same, a water outlet from the member, and means for admitting compressed air into the member to force the water therefrom through the outlet.

8. A water motor comprising a buoyant energy-receiving member, and means for causing the same to automatically submerge upon excessive movement thereof.

9. A water motor comprising a buoyant energy-receiving member, means for causing the same to automatically submerge upon excessive movement thereof, and supports on which the member seats when submerged.

10. A water motor comprising a buoyant energy-receiving member, a weight suspended from said member to assist the downward movement thereof, and a mechanism actuated by the movements of the member.

In testimony whereof I affix my signature.

PAUL A. MELVIN.